US012792018B2

(12) United States Patent
Bhashetty et al.

(10) Patent No.: US 12,792,018 B2
(45) Date of Patent: Nov. 10, 2026

(54) MICRODATA FACTORIES AND MICRODATA MOVERS

(71) Applicant: Bank of America Corporation, Charlotte, NC (US)

(72) Inventors: Mahesh Bhashetty, Plainsboro, NJ (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 399 days.

(21) Appl. No.: 18/675,280

(22) Filed: May 28, 2024

(65) Prior Publication Data

US 2025/0370433 A1 Dec. 4, 2025

(51) Int. Cl.

*G06N 10/60* (2022.01)
*G05B 19/418* (2006.01)
*G06F 7/08* (2006.01)

(52) U.S. Cl.

CPC ......... *G05B 19/41835* (2013.01); *G06F 7/08* (2013.01); *G06N 10/60* (2022.01); *G05B 2219/31001* (2013.01)

(58) Field of Classification Search

None
See application file for complete search history.

(56) References Cited

U.S. PATENT DOCUMENTS

| | | | | |
|---|---|---|---|---|
| 5,285,276 | A * | 2/1994 | Citta | H04N 19/37 375/E7.091 |
| 6,700,896 | B1 * | 3/2004 | Beshai | H04J 14/0278 370/542 |
| 9,910,427 | B2 * | 3/2018 | Aqlan | G05B 19/418 |
| 11,157,826 | B2 * | 10/2021 | Figgatt | G06F 7/501 |
| 11,372,895 | B2 * | 6/2022 | Crawford | G06F 16/285 |
| 2018/0239928 | A1 * | 8/2018 | Kurian | G06F 21/6263 |
| 2018/0241552 | A1 * | 8/2018 | Kurian | H04L 9/0852 |
| 2018/0309785 | A1 * | 10/2018 | Kurian | G06F 16/22 |
| 2022/0368613 | A1 * | 11/2022 | Darji | G06F 21/604 |
| 2022/0405627 | A1 * | 12/2022 | Blumel | G06N 10/20 |
| 2025/0077916 | A1 * | 3/2025 | Ali | G06N 5/046 |

* cited by examiner

*Primary Examiner* — Hasanul Mobin
(74) *Attorney, Agent, or Firm* — Weiss & Arons LLP

(57) ABSTRACT

Methods and apparatus for using quantum computing processors to execute microdata factories and microdata movers. The methods and apparatus may include receiving a dataset at an entity computing system. The methods and apparatus may include segmenting the dataset into a plurality of data segments using an artificial intelligence ("AI") model. The methods and apparatus may include leveraging, via quantum entanglement, each of the plurality of data segments at one or more jump point stations. The methods and apparatus may include executing a plurality of microdata movers. Each of the plurality of microdata movers may move each of the plurality of data segments. The methods and apparatus may include executing a plurality of microdata factories. Each of the plurality of microdata factories may sort each of the plurality of data segments.

20 Claims, 3 Drawing Sheets

MICRODATA FACTORIES AND MICRODATA MOVERS

FIELD OF TECHNOLOGY

Aspects of the disclosure relate to microdata factories and microdata movers.

BACKGROUND OF THE DISCLOSURE

Currently, a large amount of data is generated daily. The data may include various types and attributes. Many times, the data is unstructured and requires large amounts of processing power to structure the data.

It is predicted that there will come a time when the traditional way data is moved will become a hindrance to moving the data itself. This is because the size of the data may be too large and unstructured to move without considering the medium of movement.

It would be desirable to harness the power of quantum computing to package data in various quantities. It would be further desirable to harness the power of quantum computing to stream the data from a first location to a second location. It would be yet further desirable to create breakpoints within the data. The breakpoints may enable a system to structure and leverage the data for more efficient movement.

It would therefore be desirable to develop apparatus and methods for producing microdata factories and microdata movers using quantum computing to create breakpoints within the data leveraging multiple data locations simultaneously.

SUMMARY OF THE DISCLOSURE

Apparatus and methods to produce microdata factories and microdata movers are provided. The apparatus and methods may enable the ability to move data as it is generated and move the data in small, manageable data packets. The apparatus and methods may enable the ability to move data in small, manageable data packets using quantum computer processors.

The apparatus and methods may enable the ability to move data in small, manageable data packets using quantum computer processors and artificial intelligence ("AI"). The apparatus and methods may enable the ability to move data in small, manageable data packets using quantum computer processors and AI while maintaining computer processing efficiency.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
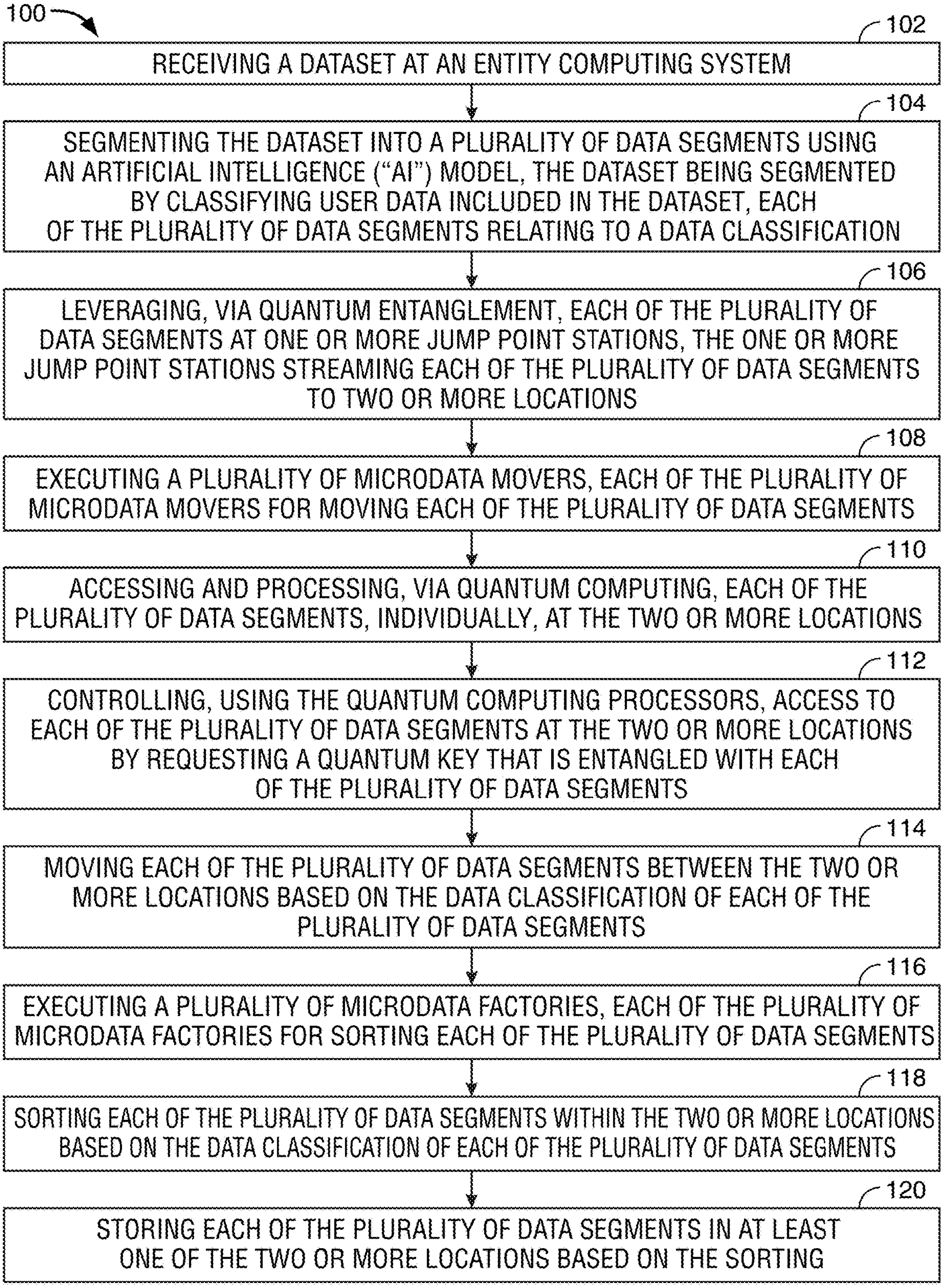
FIG. 1 shows a schematic flowchart of a method in accordance with principles of the disclosure.

Apparatus and methods are provided to execute microdata factories and microdata movers using quantum computing and an AI model.

Because quantum computing is so fast, data can be transferred in microquantities without incurring additional cost or sacrificing relevant speed. Because of this, data can be classified and divided as soon as it is received. The classified data can be sent to an appropriate location.

Data may be generated in vast and structured amounts with varied types and attributes. The ability to package the data in various quantities and stream at generation or aggregation time to send through different stream allows data to be consumed and leveraged at jump point stations. As data passes through the jump point the data can, per quantum entanglement, appear at two or more locations for access and processing.

Methods may include using quantum computing processors to execute microdata factories and microdata movers. Methods may include receiving a dataset at an entity computing system. Methods may include segmenting the dataset into a plurality of data segments using an AI model. The dataset may be segmented by classifying user data included in the dataset. Each of the plurality of data segments may relate to a data classification.

Methods may include leveraging, via quantum entanglement, each of the plurality of data segments at one or more jump point stations. The one or more jump point stations may stream each of the plurality of data segments to two or more locations.

Methods may include executing a plurality of microdata movers. Each of the plurality of microdata movers may regulate movement of each of the plurality of data segments between two or more locations.

Methods may include individually accessing and processing, via quantum computing, each of the plurality of data segments, individually, at the two or more locations.

Methods may include controlling, using the quantum computing processors, access to each of the plurality of data segments at the two or more locations by requesting a quantum key that is entangled with each of the plurality of data segments.

Methods may include moving each of the plurality of data segments between the two or more locations based on the data classification of each of the plurality of data segments.

Methods may include executing a plurality of microdata factories, each of the plurality of microdata factories for sorting each of the plurality of data segments between two or more locations.

Methods may include sorting each of the plurality of data segments between the two or more locations based on the data classification of each of the plurality of data segments. Methods may include storing each of the plurality of data segments in at least one of the two or more locations based on the sorting.

Methods may include the AI model being a generative AI model that uses a large language model ("LLM") to identify each data classification associated with each of the plurality of data segments. Methods may include the microdata movers and the microdata factories increasing a storage capacity of the entity computing system.

Methods may include segmenting each data segment into a data segment having a data size. Methods may include the data size including megabits. Methods may include the data size including kilobits. Methods may include the data size including bits.

Methods may include the dataset being sent over a predetermined time through a plurality of streams allowing the dataset to be consumed and leveraged at the one or more jump point stations. Methods may include the dataset appearing at the two or more locations via quantum entanglement. Methods may include using microdata movers and the microdata factories to move and sort a plurality of datasets with no reduction in computer processing efficiency.

The apparatus may include quantum computing processors and executable instructions. The executable instructions, when executed by the quantum computing processors on a computer system, may function to execute microdata factories and microdata movers.

The apparatus may function by using quantum computing processors to execute microdata factories and microdata movers. Apparatus may function by receiving a dataset at an entity computing system. Apparatus may function by segmenting the dataset into a plurality of data segments using an AI model. The dataset may be segmented by classifying user data included in the dataset. Each of the plurality of data segments may relate to a data classification.

The apparatus may function by leveraging, via quantum entanglement, each of the plurality of data segments at one or more jump point stations. The one or more jump point stations may stream each of the plurality of data segments to two or more locations.

The apparatus may function by executing a plurality of microdata movers. Each of the plurality of microdata movers may regulate movement of each of the plurality of data segments between two or more locations.

The apparatus may function by individually accessing and processing, via quantum computing, each of the plurality of data segments, individually, at the two or more locations.

The apparatus may function by controlling, using the quantum computing processors, access to each of the plurality of data segments at the two or more locations by requesting a quantum key that is entangled with each of the plurality of data segments.

The apparatus may function by moving each of the plurality of data segments between the two or more locations based on the data classification of each of the plurality of data segments.

The apparatus may function by executing a plurality of microdata factories, each of the plurality of microdata factories for sorting each of the plurality of data segments.

The apparatus may function by sorting each of the plurality of data segments between the two or more locations based on the data classification of each of the plurality of data segments. The apparatus may function by storing each of the plurality of data segments in at least one of the two or more locations based on the sorting. The apparatus may function by storing each of the plurality of data segments within the two or more locations based on the sorting.

The apparatus may function by the AI model being a generative AI model that uses an LLM to identify each data classification associated with each of the plurality of data segments. The apparatus may function by the microdata movers and the microdata factories increasing a storage capacity of the entity computing system.

The apparatus may function by segmenting each data segment into a data segment having a data size. The apparatus may function by the data size including megabits. The apparatus may function by the data size including kilobits. The apparatus may function by the data size including bits.

The apparatus may function by the dataset being sent over a predetermined time through a plurality of streams allowing the dataset to be consumed and leveraged at the one or more jump point stations. The apparatus may function by the dataset appearing at the two or more locations via quantum entanglement. The apparatus may function by using microdata movers and the microdata factories to regulate movement between two or more locations and sort a plurality of datasets with no reduction in computer processing efficiency.

The steps of illustrative methods may be performed in an order other than the order shown or described herein. Some embodiments may omit steps shown or described in connection with the illustrative methods. Some embodiments may include steps that are neither shown nor described in connection with the illustrative methods. Illustrative method steps may be combined. For example, one illustrative method may include steps shown in connection with another illustrative method.

Some embodiments may omit features shown or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus or some or all of the steps of the illustrative methods.

The illustrative apparatus and methods will now be described with reference to the accompanying Figures, which form a part hereof. It is to be understood that other embodiments may be utilized, and that structural, functional, and procedural modifications may be made without departing from the scope and spirit of the present disclosure.

FIG. 1 shows an exemplary flow chart 100 of a method in accordance with the principles of the disclosure.

The method may include step 102, receiving a dataset at an entity computing system. The method may include a next step 104, segmenting the dataset into a plurality of data segments using an AI model, the dataset being segmented by classifying user data included in the dataset, each of the plurality of data segments relating to a data classification.

The method may include a next step 106, leveraging, via quantum entanglement, each of the plurality of data segments at one or more jump point stations, the one or more jump point stations streaming each of the plurality of data segments to two or more locations. The method may include a next step 108, executing a plurality of microdata movers, each of the plurality of microdata movers for regulating movement of each of the plurality of data segments.

The method may include a next step 110, individually accessing and processing, via quantum computing, each of the plurality of data segments, individually, at the two or more locations. The method may include a next step 112, controlling, using the quantum computing processors, access to each of the plurality of data segments at the two or more locations by requesting a quantum key that is entangled with each of the plurality of data segments.

The method may include a next step 114, moving each of the plurality of data segments between the two or more locations based on the data classification of each of the plurality of data segments. The method may include a next step 116, executing a plurality of microdata factories, each of the plurality of microdata factories for sorting each of the plurality of data segments between two or more locations.

The method may include a next step 118, sorting each of the plurality of data segments between the two or more locations based on the data classification of each of the plurality of data segments. The method may include a next step 120, storing each of the plurality of data segments in at least one of the two or more locations based on the sorting.

Figure 2:
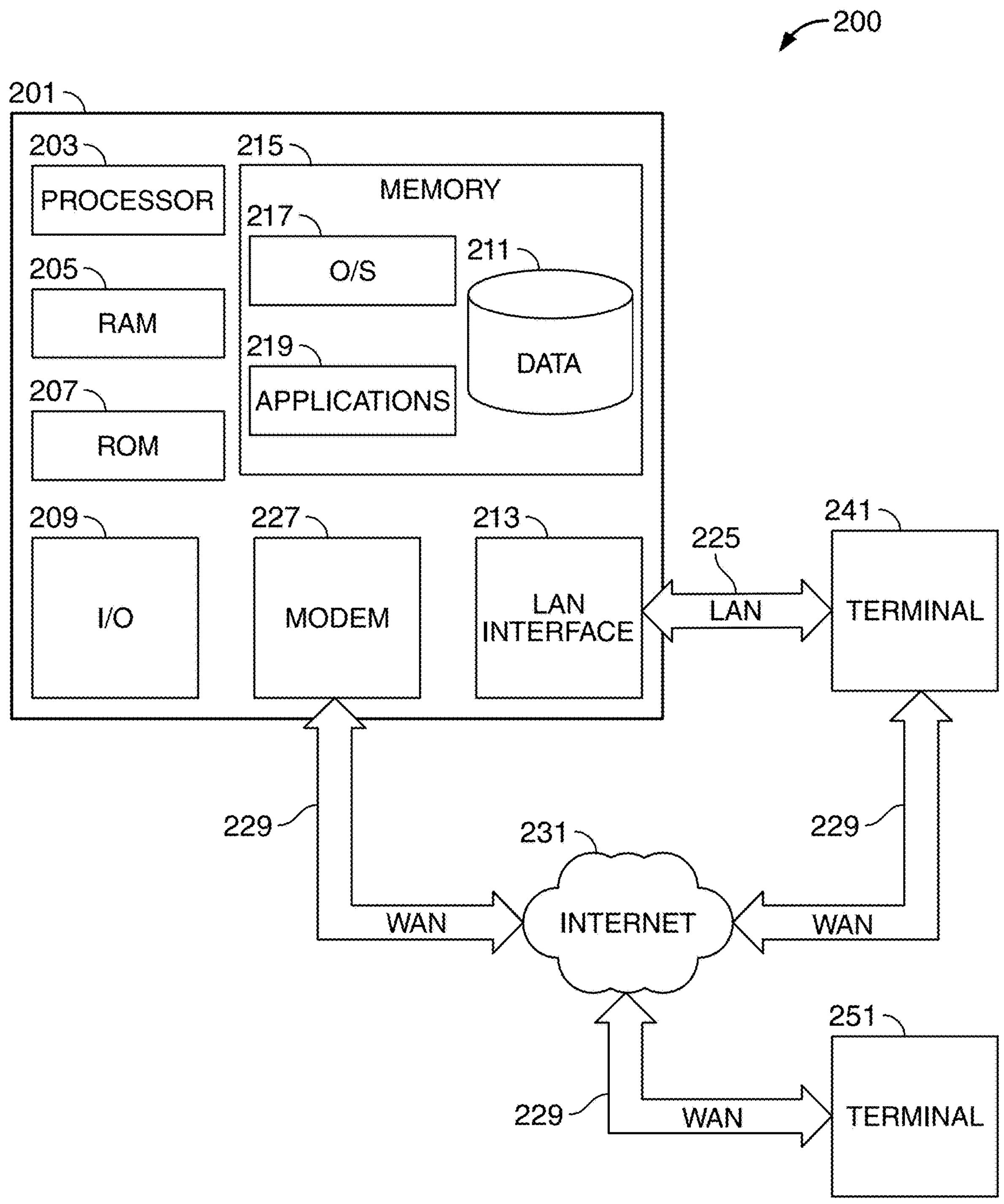
FIG. 2 shows an illustrative system in accordance with principles of the disclosure.

FIG. 2 shows an illustrative block diagram of system 200 that includes computer 201. Computer 201 may alternatively be referred to herein as an "engine," "server" or a "computing device." Computer 201 may be a workstation, desktop, laptop, tablet, smartphone, or any other suitable computing device. Elements of system 200, including computer 201, may be used to implement various aspects of the systems and methods disclosed herein. Each of the systems, methods and algorithms illustrated below may include some or all of the elements and apparatus of system 200.

Computer 201 may have a processor 203 for controlling the operation of the device and its associated components, and may include RAM 205, ROM 207, input/output ("I/O") 209, and a non-transitory or non-volatile memory 215. Machine-readable memory may be configured to store information in machine-readable data structures. The processor 203 may also execute all software running on the computer. Other components commonly used for computers, such as EEPROM or Flash memory or any other suitable components, may also be part of the computer 201.

The memory 215 may be comprised of any suitable permanent storage technology—e.g., a hard drive. The memory 215 may store software including the operating system 217 and application program(s) 219 along with any data 211 needed for the operation of the system 200. Memory 215 may also store videos, text, and/or audio assistance files. The data stored in memory 215 may also be stored in cache memory, or any other suitable memory.

I/O module 209 may include connectivity to a microphone, keyboard, touch screen, mouse, and/or stylus through which input may be provided into computer 201. The input may include input relating to cursor movement. The input/output module may also include one or more speakers for providing audio output and a video display device for providing textual, audio, audiovisual, and/or graphical output. The input and output may be related to computer application functionality.

System 200 may be connected to other systems via a local area network ("LAN") interface 213. System 200 may operate in a networked environment supporting connections to one or more remote computers, such as terminals 241 and 251. Terminals 241 and 251 may be personal computers or servers that include many or all of the elements described above relative to system 200. The network connections depicted in FIG. 2 include a LAN 225 and a wide area network ("WAN") 229 but may also include other networks. When used in a LAN networking environment, computer 201 is connected to LAN 225 through LAN interface 213 or an adapter. When used in a WAN networking environment, computer 201 may include a modem 227 or other means for establishing communications over WAN 229, such as Internet 231.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 219, which may be used by computer 201, may include computer executable instructions for invoking functionality related to communication, such as e-mail, Short Message Service ("SMS"), and voice input and speech recognition applications. Application program(s) 219 (which may be alternatively referred to herein as "plugins," "applications," or "apps") may include computer executable instructions for invoking functionality related to performing various tasks. Application program(s) 219 may utilize one or more algorithms that process received executable instructions, perform power management routines or other suitable tasks.

Application program(s) 219 may include computer executable instructions (alternatively referred to as "programs"). The computer executable instructions may be embodied in hardware or firmware (not shown). The computer 201 may execute the instructions embodied by the application program(s) 219 to perform various functions.

Application program(s) 219 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 211, and any other suitable information, may be stored in memory 215.

The disclosure may be described in the context of computer-executable instructions, such as application(s) 219, being executed by a computer. Generally, programs include routines, programs, objects, components, data structures, etc., that perform particular tasks or implement particular data types. The disclosure may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 201 and/or terminals 241 and 251 may also include various other components, such as a battery, speaker, and/or antennas (not shown). Components of computer system 201 may be linked by a system bus, wirelessly or by other suitable interconnections. Components of computer system 201 may be present on one or more circuit boards. In some embodiments, the components may be integrated into a single chip. The chip may be silicon-based.

Terminal 241 and/or terminal 251 may be portable devices such as a laptop, cell phone, tablet, smartphone, or any other computing system for receiving, storing, transmitting and/or displaying relevant information. Terminal 241 and/or terminal 251 may be one or more user devices. Terminals 241 and 251 may be identical to system 200 or different. The differences may be related to hardware components and/or software components.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 3:
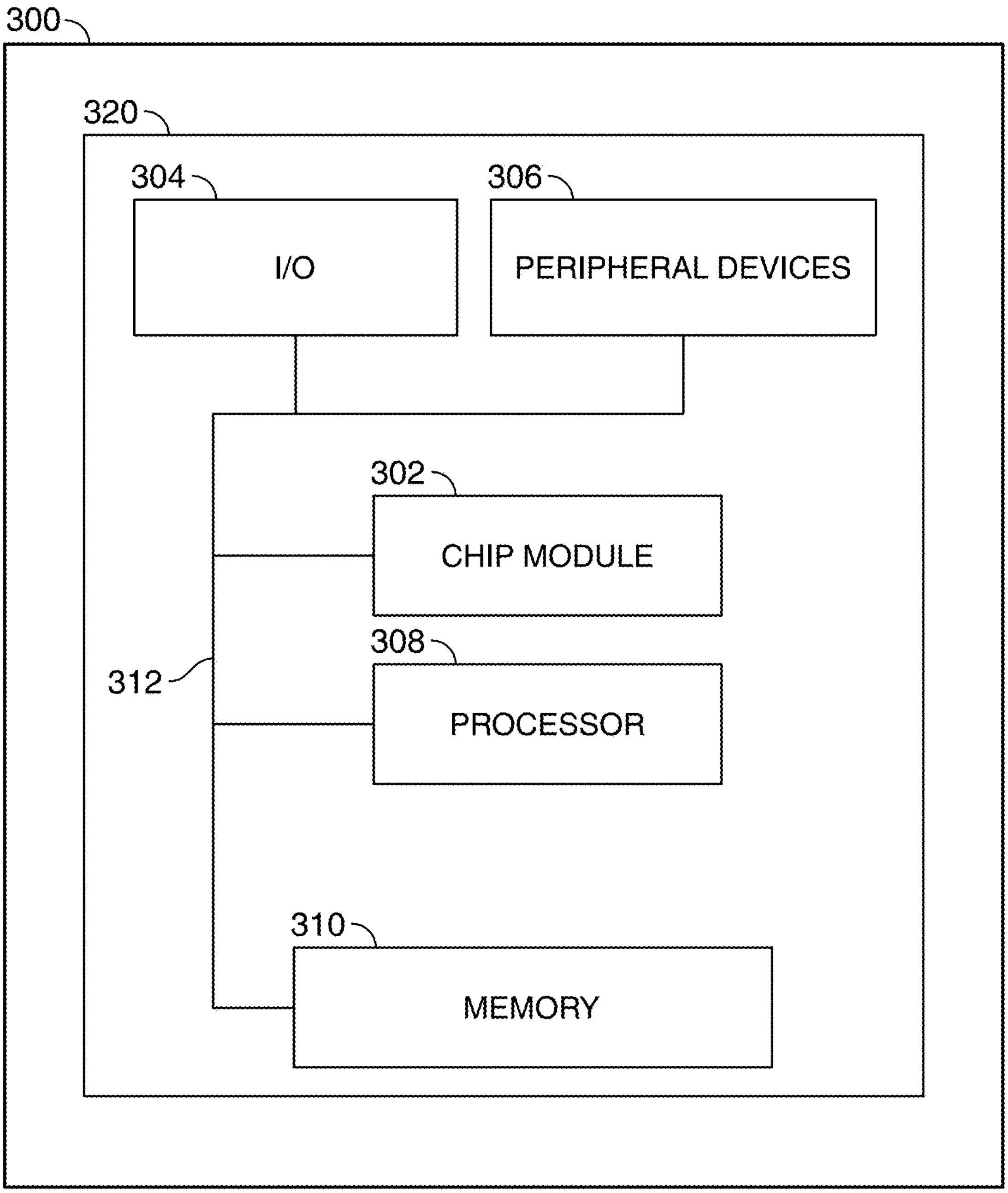
FIG. 3 shows an illustrative system in accordance with principles of the disclosure.

FIG. 3 shows illustrative apparatus 300 that may be configured in accordance with the principles of the disclosure. Apparatus 300 may be a computing device. Apparatus 300 may include one or more features of the apparatus shown in FIG. 2. Apparatus 300 may include chip module 302, which may include one or more integrated circuits, and which may include logic configured to perform any other suitable logical operations.

Apparatus 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable media or devices; peripheral devices 306, which may include counter timers, real-time timers, power-on reset generators or any other suitable peripheral devices; logical processing device 308, which may compute data structural information and structural parameters of the data; and machine-readable memory 310.

Machine-readable memory 310 may be configured to store in machine-readable data structures: machine executable instructions, (which may be alternatively referred to herein as "computer instructions" or "computer code"), applications such as applications 219, signals, and/or any other suitable information or data structures.

Components 302, 304, 306, 308 and 310 may be coupled together by a system bus or other interconnections 312 and may be present on one or more circuit boards such as circuit board 320. In some embodiments, the components may be integrated into a single chip. The chip may be silicon-based.

As will be appreciated by one of skill in the art, methods and apparatus shown or described herein may be embodied in whole or in part as a method, an apparatus or product by process. Accordingly, such apparatus may take the form of, and such methods may be performed by, an entirely hardware embodiment, an entirely software embodiment or an embodiment combining software, hardware and any other suitable approach or apparatus.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods to use quantum computing processors to execute microdata factories and microdata movers are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for using quantum computing processors to execute microdata factories and microdata movers, the method comprising:

receiving a dataset at an entity computing system;

segmenting the dataset into a plurality of data segments using an artificial intelligence ("AI") model, the dataset being segmented by classifying user data included in the dataset, each of the plurality of data segments relating to a data classification;

leveraging, via quantum entanglement, each of the plurality of data segments at one or more jump point stations, the one or more jump point stations for streaming each of the plurality of data segments to two or more locations;

executing a plurality of microdata movers, each of the plurality of microdata movers for regulating movement of each of the plurality of data segments between the two or more locations; the executing comprising:

individually accessing and processing, at each of the two or more locations, each of the plurality of data segments, said accessing and processing occurring via quantum computing;

controlling, using the quantum computing processors, access to each of the plurality of data segments at the two or more locations by requesting a quantum key that is entangled with each of the plurality of data segments; and regulating movement of each of the plurality of data segments between the two or more locations based on the data classification of each of the plurality of data segments;

executing a plurality of microdata factories, each of the plurality of microdata factories for sorting each of the plurality of data segments between the two or more locations, the executing comprising:

sorting, between the two or more locations, each of the plurality of data segments, based on the data classification of each of the plurality of data segments; and storing, within the two or more locations, each of the plurality of data segments, based on the sorting.

2. The method of claim 1 wherein the AI model is a generative AI model that uses a large language model ("LLM") to identify each data classification associated with each of the plurality of data segments.

3. The method of claim 1 wherein the microdata movers and the microdata factories increase a storage capacity of the entity computing system.

4. The method of claim 1 wherein the segmenting includes segmenting each data segment into a data segment having a data size.

5. The method of claim 4 wherein the data size includes megabits.

6. The method of claim 4 wherein the data size includes kilobits.

7. The method of claim 4 wherein the data size includes bits.

8. The method of claim 1 wherein the dataset is sent over a predetermined time through a plurality of streams allowing the dataset to be consumed and leveraged at the one or more jump point stations.

9. The method of claim 1 wherein the dataset appears at the two or more locations via quantum entanglement.

10. The method of claim 1 wherein the microdata movers and the microdata factories are used to move and sort a plurality of datasets with no reduction in computer processing efficiency.

11. Apparatus for producing microdata factories and microdata movers, the apparatus comprising quantum computing processors and executable instructions that, when executed by the quantum computing processors on a computer system, function by:

receiving a dataset at an entity computing system;

segmenting the dataset into a plurality of data segments using an artificial intelligence ("AI") model, the dataset being segmented by classifying user data included in the dataset, each of the plurality of data segments relating to a data classification;

leveraging, via quantum entanglement, each of the plurality of data segments at one or more jump point stations, the one or more jump point stations for streaming each of the plurality of data segments to two or more locations;

executing a plurality of microdata movers, each of the plurality of microdata movers for regulating movement of each of the plurality of data segments between the two or more locations; the executing comprising:

individually accessing and processing, at each of the two or more locations, each of the plurality of data segments, said accessing and processing occurring via quantum computing;

controlling, using the quantum computing processors, access to each of the plurality of data segments at the two or more locations by requesting a quantum key that is entangled with each of the plurality of data segments; and regulating movement of each of the plurality of data segments between the two or more locations based on the data classification of each of the plurality of data segments;

executing a plurality of microdata factories, each of the plurality of microdata factories for sorting each of the plurality of data segments between the two or more locations, the executing comprising:

sorting, between the two or more locations, each of the plurality of data segments, based on the data classification of each of the plurality of data segments; and storing, within the two or more locations, each of the plurality of data segments, based on the sorting.

12. The apparatus of claim 11 wherein the AI model is a generative AI model that uses a large language model ("LLM") to identify each data classification associated with each of the plurality of data segments.

13. The apparatus of claim 11 wherein the microdata movers and the microdata factories increase a storage capacity of the entity computing system.

14. The apparatus of claim 11 wherein the segmenting includes segmenting each data segment into a data segment having a data size.

15. The apparatus of claim 14 wherein the data size includes megabits.

16. The apparatus of claim 14 wherein the data size includes kilobits.

17. The apparatus of claim 14 wherein the data size includes bits.

18. The apparatus of claim 11 wherein the dataset is sent over a predetermined time through a plurality of streams allowing the dataset to be consumed and leveraged at the one or more jump point stations.

19. The apparatus of claim 11 wherein the dataset appears at the two or more locations via quantum entanglement.

20. The apparatus of claim 11 wherein the microdata movers and the microdata factories are used to move and sort a plurality of datasets with no reduction in computer processing efficiency.

* * * * *